United States Patent
Batada et al.

(10) Patent No.: US 8,447,699 B2
(45) Date of Patent: May 21, 2013

(54) GLOBAL SECURE SERVICE PROVIDER DIRECTORY

(75) Inventors: Asif Batada, Atlanta, GA (US); Moshe Levy, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 576 days.

(21) Appl. No.: 12/717,620

(22) Filed: Mar. 4, 2010

(65) Prior Publication Data

US 2011/0087610 A1    Apr. 14, 2011

Related U.S. Application Data

(60) Provisional application No. 61/251,231, filed on Oct. 13, 2009.

(51) Int. Cl.
*G06Q 20/00*    (2006.01)

(52) U.S. Cl.
USPC ............... 705/65; 705/51; 705/52; 705/53; 705/54; 705/55; 705/56; 705/57; 705/58; 705/59; 705/67; 726/1; 726/2; 726/3; 726/26

(58) Field of Classification Search
USPC .................................................. 705/51–67
See application file for complete search history.

(56) References Cited

U.S. PATENT DOCUMENTS

| 5,208,446 A | * | 5/1993 | Martinez | 235/380 |
| 5,221,838 A | * | 6/1993 | Gutman et al. | 235/379 |
| 5,387,784 A | * | 2/1995 | Sarradin | 235/380 |
| 2010/0291896 A1 | * | 11/2010 | Corda | 455/410 |

* cited by examiner

*Primary Examiner* — Calvin Loyd Hewitt, II
*Assistant Examiner* — Cristina Owen Sherr
(74) *Attorney, Agent, or Firm* — Nicholas A. Cole

(57) ABSTRACT

Systems and methods enable members of a secure transaction network to readily identify the appropriate trusted service manager (TSM) to support a particular transaction. A global directory of TSM providers is provided that a secure service provider can use for determining which TSM provider is the authorized manager of a security domain for the particular transaction. In aspect the directory of TSM providers may be stored within a mobile device secure element. In another aspect, the directory of TSM providers may be stored in a central TSM repository. In a further aspect, the directory of TSM providers may be distributed among a number of secondary TSM repositories. The appropriate TSM may be identified based upon a secure element identifier and an application identifier provided by a secure element as part of the transaction. Communication of the identifiers from mobile devices may be via cellular or near field communication links.

34 Claims, 13 Drawing Sheets

| Sec Dom AID | Parent AID | TSM Provider ID | ... |
|---|---|---|---|
| 39450283 | 39450283 | 61458 | xxxx |
| 39455468 | 39450283 | 61458 | xxxx |
| 39453456 | 39450283 | 98438 | xxxx |
| 39449815 | 39453456 | 98438 | xxxx |

FIG. 3

| Sec Dom AID | Secure Element ID | TSM Provider ID |
|---|---|---|
| 39450283 | 8e203f2bc4 | 61458 |
| 39455468 | 942ec23a5b | 61458 |
| 39453456 | c9e34da26 | 98438 |
| 39449815 | 8416b23a5 | 98438 |

FIG. 6

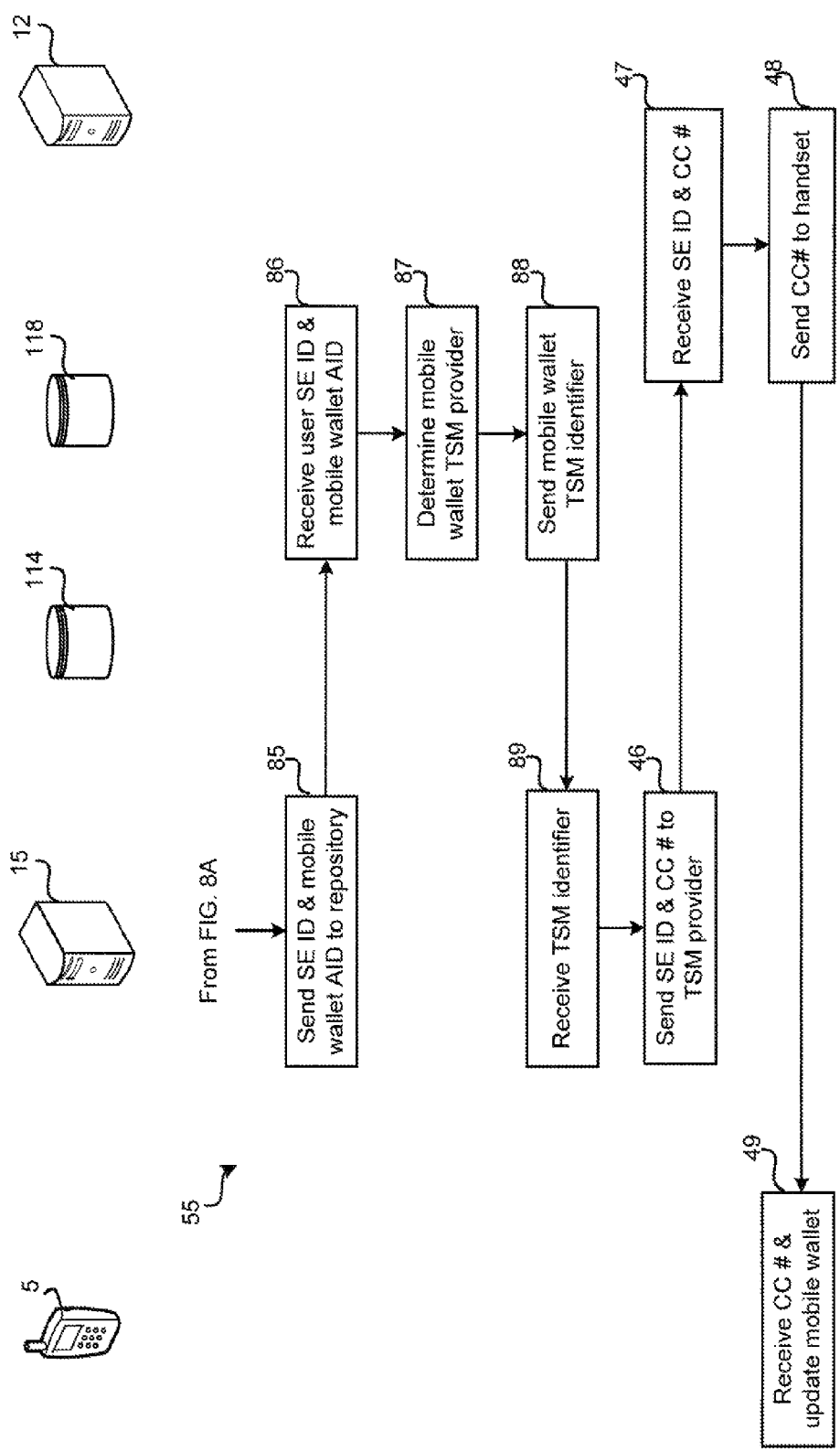

FIG. 9A — Table 115

| Secure Element ID (112) | Repository ID (116) |
|---|---|
| 8e203f2bc4 | 61458 |
| 942ec23e5b | 61458 |
| c9e34da26 | 98438 |
| 8416b23a5 | 98438 |

Rows: 121, 122, 123, 124

FIG. 9B — Table 119

| Security Domain AID (91) | Secure Element ID (112) | TSM Provider ID (93) |
|---|---|---|
| 39450283 | 8e203f2bc4 | 61458 |
| 39455468 | 942ec23e5b | 61458 |
| 39453456 | c9e34da26 | 98438 |
| 39449815 | 8416b23a5 | 98438 |

Rows: 125, 126, 127, 128

GLOBAL SECURE SERVICE PROVIDER DIRECTORY

RELATED APPLICATIONS

The present application claims priority to U.S. Provisional Patent Application Ser. No. 61/251,231, entitled GLOBAL SECURE SERVICE PROVIDER DIRECTORY, filed on Oct. 13, 2009.

FIELD OF THE INVENTION

The present invention relates generally to mobile payment systems, and more particularly to a directory for determining the identity of a service provider for a mobile payment capable device.

BACKGROUND

Mobile computing devices, such as cellular phones, may be used to execute various secure transactions, such as paying for a purchase at a retailer. A mobile device may be linked to a credit card, so that any payments made by the mobile device are debited to the appropriate account. Mobile devices may be used for a variety of monetary transactions, such as ATM withdrawals, managing transit accounts, or purchasing sports and entertainment tickets that may be stored on the device for redemption at an electronic terminal.

Secure transactions, such as credit card payments, typically take place within a highly secure network. Each device within the network must be trusted to enforce certain security measures, including smart credit cards, point-of-sale terminals (e.g., credit card readers), network switches, and bank servers. The level of security required to operate some networks may preclude a computing device from being a trusted network element if the device can also be used for non-secure purposes, such as browsing web pages or playing games.

In order to allow a general purpose computer to be a trusted member of a secure network, some computing devices may utilize a secure subsystem. Many personal computer (PC) workstations include a Trusted Platform Module® implementation for securely storing cryptographic keys. Similarly, mobile computing devices may include a secure subsystem capable of executing a secure transaction, such as providing credit card account information to a point of sale terminal. Such a secure subsystem may include a secure element, which may be implemented as an integrated circuit ("chip") with a microprocessor and onboard persistent storage. In order to enforce security measures, the secure element may be configured to interact only with other trusted members. Within some secure transaction networks, a particular mobile handset cannot function as a mobile payment device unless a trusted member provides the secure element within the mobile device with a credit card account number, as well as software code allowing the secure element to properly interact with a point-of-sale terminal. A trusted member capable of provisioning secure elements in mobile devices is known as a Trusted Service Manager.

SUMMARY

Various aspects provide a method for identifying a trusted service manager (TSM) provider that includes determining a secure element identifier corresponding to a secure element of a computing device, determining an application identifier corresponding to a security domain within the secure element, providing the secure element identifier and the application identifier to a first repository of TSM providers, and receiving, from the first repository, an identifier of the TSM provider that corresponds to the security domain. In an aspect, the method may further include providing the secure element identifier to a second repository of TSM providers, and receiving, from the second repository, an identifier of the first repository. In the method, determining a secure element identifier corresponding to a secure element may include sending a query to the secure element via a system bus connecting a central processor of the computing device to the secure element, and receiving the identifier from the secure element via the system bus. In an aspect of the method, determining a secure element identifier corresponding to a secure element may include sending a query to the secure element via a near field communication (NFC) communication link, and receiving the identifier from the secure element via the NFC communication link. In another aspect of the method, determining an application identifier corresponding to a security domain within the secure element may include sending a query to the secure element via the system bus, and receiving the identifier from the secure element via the system bus. In another aspect of the method, determining an application identifier corresponding to a security domain within the secure element may include sending a query to the secure element via the NFC communication link, and receiving the identifier from the secure element via the NFC communication link. In an aspect of the method, providing the secure element identifier and the application identifier to a first repository of TSM providers may include sending, from the mobile device, a query to the first repository of TSM providers in which the query includes the secure element identifier and the application identifier. In another aspect, the method may further include sending, from the mobile device to a server corresponding to a secure service provider, the identifier of the TSM provider that corresponds to the security domain. In another aspect of the method, providing the secure element identifier and the application identifier to a first repository of TSM providers may include sending, from a server corresponding to a secure service provider, a query to the first repository of TSM providers, in which the query includes the secure element identifier and the application identifier.

In another aspect, a transaction system includes one or more mobile devices, a bank server, a central trust repository server, and a TSM server, wherein the mobile devices, the bank server, the central trust repository server, and the TSM server are configured with executable instructions to perform the operations of the foregoing methods.

In an aspect, a mobile device may include a processor, a memory including a secure element coupled to the processor, and a transceiver coupled to the processor, in which the processor is configured with executable instructions to perform operations of the foregoing methods.

In an aspect, a server may include a processor, a memory including a secure element coupled to the processor, and a transceiver coupled to the processor, in which the processor is configured with executable instructions to perform operations of the foregoing methods.

In another aspect, a system may include means for accomplishing the functions of the foregoing methods.

In another aspect, a tangible computer-readable storage medium includes software instructions configured to cause a programmable processor to perform operations of the foregoing methods. The tangible computer-readable storage medium may be configured to be read by a server computer with the software instructions configured to cause a server to perform the server-based operations of the foregoing methods. Also, the tangible computer-readable storage medium may be configured to be read by a mobile device processor with the software instructions configured to cause a processor to perform the mobile device-based operations of the foregoing methods.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

FIG. 3 shows a data structure suitable for use with the aspect illustrated in FIG. 2.

FIG. 6 shows a data structure suitable for use with the aspect illustrated in FIG. 5.

FIGS. 9A and 9B show to data structures suitable for use with the aspect illustrated in FIG. 7.

DETAILED DESCRIPTION

Figure 1A:
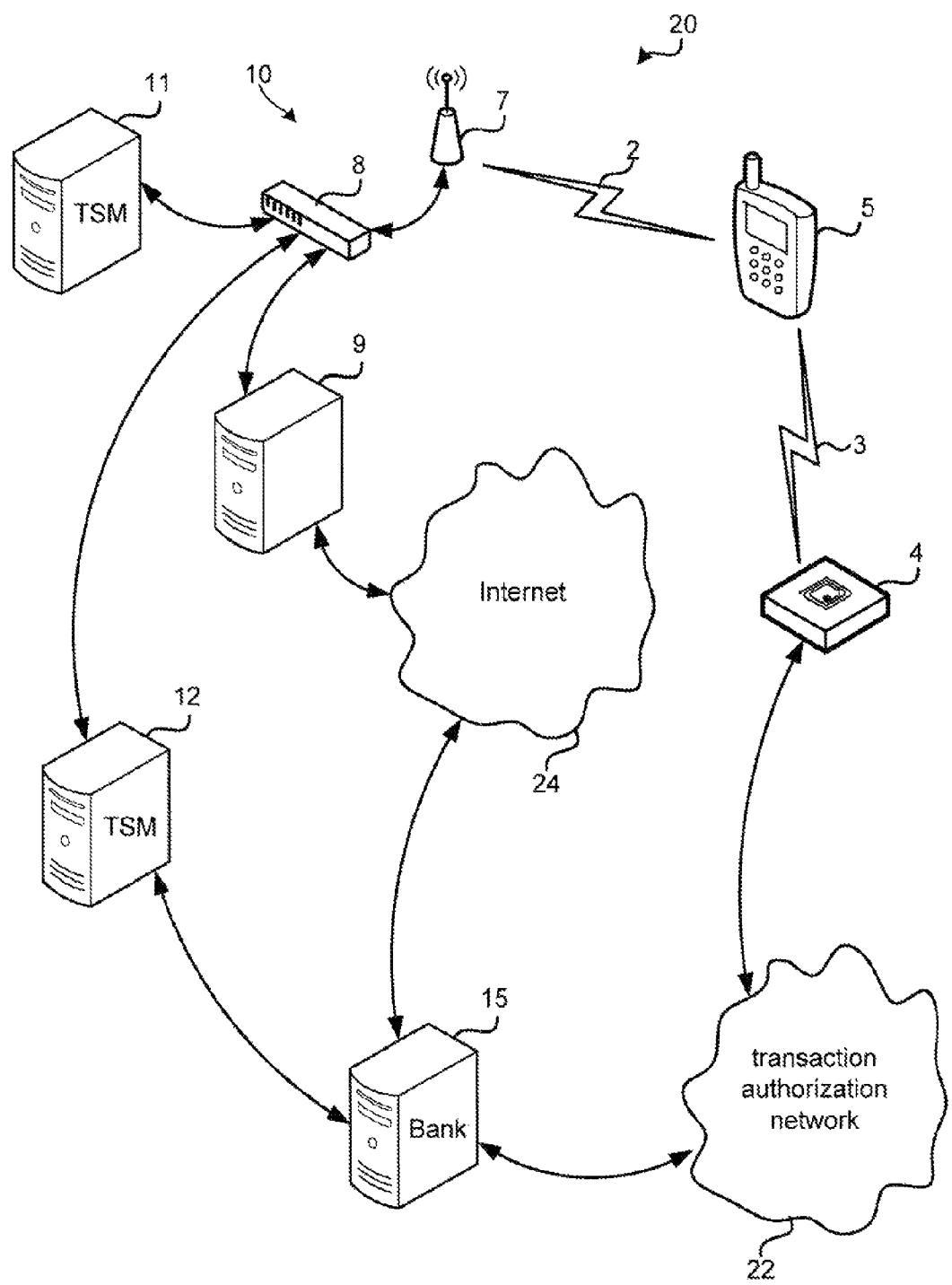
FIGS. 1A and 1B are component block diagram of a communication system suitable for use with the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "mobile handsets" and "mobile devices" are used interchangeably and refer to any one of various cellular telephones, personal data assistants (PDA's), palm-top computers, laptop computers, wireless electronic mail receivers (e.g., the Blackberry° and Treo® devices), and multimedia Internet enabled cellular telephones (e.g., the Blackberry Storm®), and similar personal electronic devices. A mobile device may include a programmable processor and memory as described more fully below with reference to FIG. 11. The term "computing device" is used herein to refer to any device including a programmable processor and memory, including mobile devices, desktop computers, workstations, mainframe computers, and embedded computer systems.

As used herein, the term "secure element" refers to an integrated circuit ("chip") with a microprocessor and onboard persistent storage that may be included in the mobile device and configured to enable communications in a secure network.

In some cellular networks with mobile devices capable of secure transactions, a trusted party that manages the various secure elements may be known as a Trusted Service Manager, which is typically referred to as a "TSM". A TSM may be capable of configuring a secure element over the cellular network without being inhibited by a malicious user or malicious code executing within the main operating system of the mobile device. A secure element may be managed by a single TSM, or it may be managed by a plurality of different TSMs. The various applications and data stored on the secure element may be divided into a hierarchy of security domains, with each security domain managed by a TSM. In order to establish a new SSD (e.g., configuring a mobile handset as a mobile payment device), the service provider (e.g., a bank) may need to determine which TSM manages the parent security domain (i.e., the security domain within which the new SSD will be established). As more secure services are capable of being implemented on a mobile device, more TSMs will be established. As more TSM are established, finding the proper TSM for a particular task will become increasingly difficult.

The various aspects provide systems and methods for enabling members of a secure transaction network to readily identify the appropriate TSM to support a particular transaction. In particular, the various aspects provide methods that a secure service provider can use for determining which TSM provider is the authorized manager of a security domain for a particular transaction by using a global directory of TSM providers.

The aspects may operate in conjunction with mobile devices configured to support secure transactions, such as mobile payments. In some aspects, a mobile device may include a secure element as part of a secure subsystem. The secure element may be configured to send and receive messages via a cellular network using a cellular telephone transceiver, to send and receive messages from the mobile device operating system via a system bus, and to send and receive messages from other devices via a near field communication (NFC) transceiver.

As part of a secure system, the secure element may not be significantly altered via messages that fall outside a strict set of rules. For example, the secure element may set up a new service (e.g., configuring itself for credit card transactions) only in response to a trusted message received via a cellular telephone network. Further, to determine whether a message is trusted, a secure element may utilize one or more cryptographic keys to verify the message. The various aspects may utilize one of the many well known key-based trust schemes. Simply put, some aspects may use a scheme whereby a message received is not trusted unless the message is encoded in a way that proves that the sender of the message possesses a specific cryptographic key. In such an aspect, the security of the entire system is largely based on preventing the various keys from being known to malicious users. Accordingly, the various aspects may utilize one or more trusted TSM servers dedicated to managing the various secure elements including maintaining the secret keys. A TSM provider may be a commercial entity that manages one or more TSM servers.

TSM providers may perform a variety of services related to enabling secure transactions. In some aspects, a TSM provider is capable of provisioning a new service. For example, a mobile device with a secure element may be at first managed solely by a first TSM. In order to configure the mobile device for a specific transaction, such as Visa® credit card purchases, the first TSM may send a message to the mobile device including one or more cryptographic keys which allows the mobile device to trust a second TSM server related to a bank that maintains Visa® credit card accounts. The first TSM may also send a message to the second TSM server including one or more cryptographic keys which allows the second TSM server to communicate with and verify itself to the mobile device. The second TSM server may send a message to the mobile device which includes the software that enables the secure element to communicate with point of sale devices within the Visa® network, such as via an NFC transceiver, as well as user specific data, such as a Visa® credit card account number or a set of cryptographic keys corresponding to the credit card account. Additionally, a TSM provider may "personalize" an existing service. For example, a mobile device may be configured with software that enables the secure element to communicate with point of sale devices via an NFC transceiver. A TSM may establish or update the user-specific account data, which may be a credit card number or one or more cryptographic keys.

In some aspects, the relationship between TSM providers and secure elements may be hierarchical and organized according to security domains. For example there may be a primary TSM that manages a primary security domain. The primary TSM may create one or more supplemental security domains ("SSD") and grant authority over each SSD to another TSM. Each TSM, if granted proper permissions by the primary TSM, may further create an SSD within its own SSD and grant authority to another TSM. In some aspects, there may involve a one-to-one correspondence between each SSD and a single TSM.

The arrangement of supplemental security domains within a secure element may vary among different mobile devices, even for two mobile devices with the same capabilities. Additionally, the specific TSM providers may vary across among mobile devices due to market competition, as well as other factors.

The various aspects may be employed in a variety of wired and wireless networks, including for example a wireless network employing cellular data communication links. By way of example, FIG. 1A shows a block diagram of a communication network 20 including a cellular network 10 in which some mobile cellular devices 5 have the additional ability to communicate using short range wireless communications 3, such as NFC. The network 20 may include a mobile device 5, which in the illustrated system is configured with a network antenna and transceiver for transmitting and receiving cellular signals 2 from/to a cellular base site or base station (BS) 7. In this example network 20, the base station 7 is a part of a cellular network 20 that includes elements required to operate the network, such as a mobile switching center (MSC) 8. In operation, the MSC 8 is capable of routing calls and messages to and from the mobile device 5 via the base station 7 when the mobile device 5 is making and receiving cellular data calls. The MSC 8 may also provide a connection to telephone landline trunks (not shown) when the mobile device 5 is involved in a call. Further, the MSC may be coupled to an Internet gateway server 9 coupled to the Internet 24, for providing Internet access to the mobile device 5.

The mobile device 5 may be further equipped to make mobile payments over a short range communications protocol, such as NFC. The mobile device 5 may engage in mobile payments by sending and receiving short range communication link RF signals 3 between the mobile device 5 and a mobile payment point-of-sale (POS) terminal 4. The mobile payment POS terminal 4 may be connected via a transaction authorization network 22 to a bank server 15 corresponding to a bank with which a user of the mobile device 5 maintains a credit card account. FIG. 1A presents but one example of electronic commerce transaction networks and systems which are well known.

The mobile device 5 may further include a secure element for storing data such as a credit card number. The secure element may also store and execute instructions sufficient to complete a mobile payment with a POS terminal 4 via RF signals 3. The network 20 may also include a primary TSM server 11 for sending commands to the secure element of the mobile device 5 via data packets sent over cellular signals 2. The network 20 may include additional TSM servers capable of managing the secure element of the mobile device 5 such as a bank TSM server 12, which in this example is configured to receive credit card account numbers from a bank server 15 and forward such numbers to the secure element via the Internet 24 and a cellular telephone network 10 to the mobile device 5.

Figure 1B:
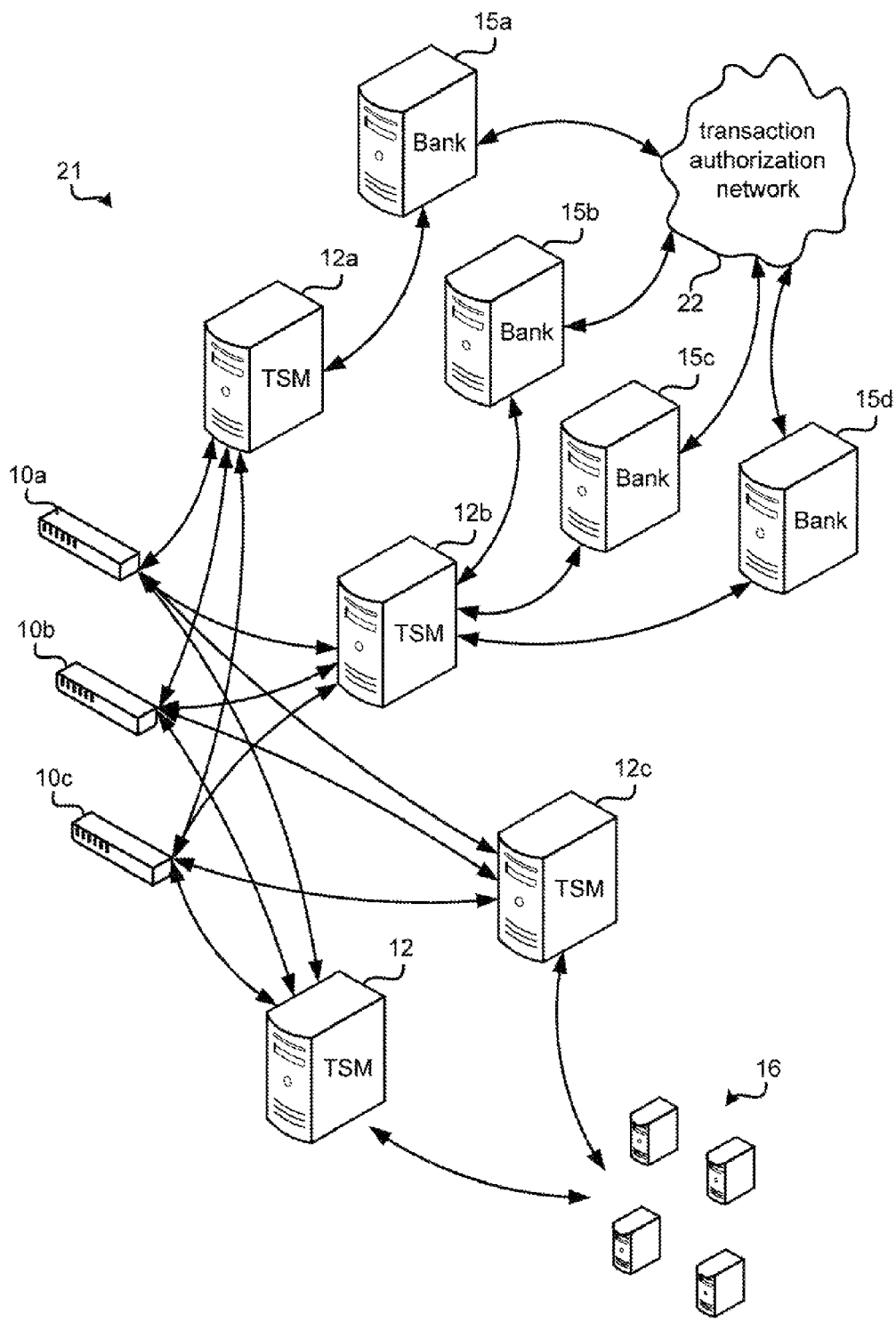

In some aspects, the secure transaction communication network 20 may include a plurality of cellular service providers, as well as a plurality of transaction authorization networks 22 and other secure service providers. By way of example, FIG. 1B shows a block diagram of a communication network 21 including a plurality of cellular networks 10a-10c, each supporting cellular communications with a plurality of mobile handsets 5 (not shown) capable of engaging in secure transactions by utilizing a secure element. The communication network 21 may also include a plurality of bank servers 15a-15d connected to a transaction authorization network 22. The bank servers 15a-15d may also be connected to the various cellular networks 10a-10c via one or more TSM servers 12a-12c. Additionally, the various mobile handsets 5 on the various cellular networks may be capable of conducting a plurality of different secure transactions other than credit card authorizations. In an aspect, one or more TSM servers 12a-12c provide mobile devices 5 with the ability to link to gift card accounts managed by retail servers 16.

Figure 2:
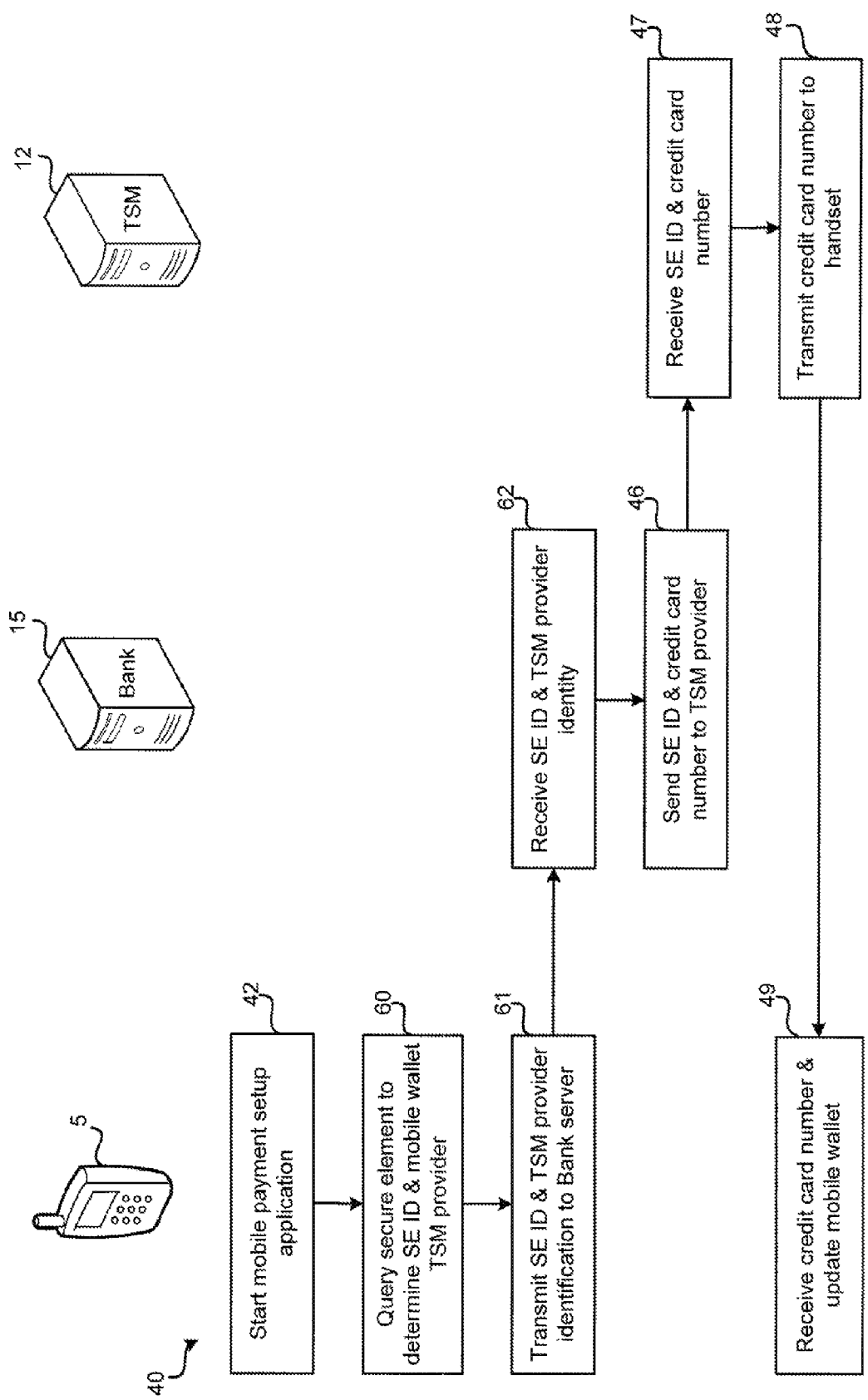
FIG. 2 is a process flow diagram of an aspect method for enabling secure service providers to discover the identity of a TSM server.

The various aspects enable secure service providers to discover the identity of a TSM server that can configure a certain mobile handset for a certain secure service. An overview of how such a service can be configured is illustrated in FIG. 2, which shows a method 40 that may be implemented on computing devices. A user of a mobile device 5 equipped with a secure element may want to enable the mobile device 5 to make credit card payments. The mobile device 5 may be equipped with a mobile wallet application and corresponding mobile wallet SSD capable of transacting with a credit card point-of-sale terminal. In order to use the mobile device 5 as a credit card, the mobile wallet application may be updated with the user's credit card account information.

In method 40 at block 42, the user may launch a mobile payment setup application on the mobile device. At block 60, the setup application may query the secure element to determine whether the mobile device 5 is equipped with a suitable mobile wallet application for mobile credit card payments, and if so, which TSM provider manages the mobile wallet. This query (block 60) may also determine the serial number of the secure element, which may also be referred to as the secure element identifier. At block 61, the setup application may transmit the secure element identifier and the TSM provider identifier to the bank server 15. At block 62, the bank server 15 may receive the secure element identifier and the TSM provider identifier. In some aspects, the setup application may be provided to the mobile device 5 as an Internet download from the website of the bank where the user has an account, and the setup application may communicate with the bank server 15 via the Internet. Alternately, the setup application may be provided to the mobile device 5 via an NFC link with an NFC terminal. In some aspects, the secure element identifier and the TSM provider identifier may be transmitted from the mobile device 5 to the bank server 15 via the NFC terminal. In another aspect, there may not be a setup application. Instead, the mobile device 5 may receive a query directly from an NFC terminal and respond with the secure element identifier and the TSM provider identifier.

Based on the TSM provider identifier, at block 46 the bank server 15 may locate the TSM server 12 corresponding to the TSM provider and send a request to link the mobile device 5 to a credit card including the secure element identifier and the credit card number. In some aspects, the TSM provider identifier may be an IP address or domain name. In other aspects, the process of locating a TSM server based on a TSM server identifier may involve a broadcast message sent over one or more private networks of TSM servers. At block 47, the TSM server 12 may receive the request from the bank server 15. At block 48, the TSM server 12 may transmit a message to the mobile device 5 instructing it to update the mobile wallet with the specific credit card information. The message may be received by the mobile device 5 and the mobile wallet may be updated at block 49. In some aspects, the mobile wallet may determine that the message is properly encoded with a cryptographic key corresponding only to that particular mobile wallet SSD.

In the foregoing example, the mobile device may be responsible for maintaining the identity of its TSM providers. An example of a data table for storing such data in the secure element is presented in FIG. 3, which shows a data structure that may be implemented on a computing device, such as a mobile device 5. The secure element of a mobile device 5 may include data storage (e.g., FLASH memory), including a security domain data table 90 that stores information about the various security domains in a plurality of data records (shown as rows) 95, 96, 97, 98, each including a plurality of data fields 91, 92, 93, 94. Each security domain has an identifier that is unique to the secure element, which may be stored in a data field 91. In an implementation in which the security domains are arranged hierarchically, the security domain data table 90 may include a data field 92 storing the identifier of a parent security domain. The security domain data table 90 may also store an identifier of a TSM provider in a third data field 93. The security domain data table 90 may further include additional data fields 94 for storing other data relevant to the security domains, such as the granted permissions or the assigned cryptographic keys.

Figure 4:
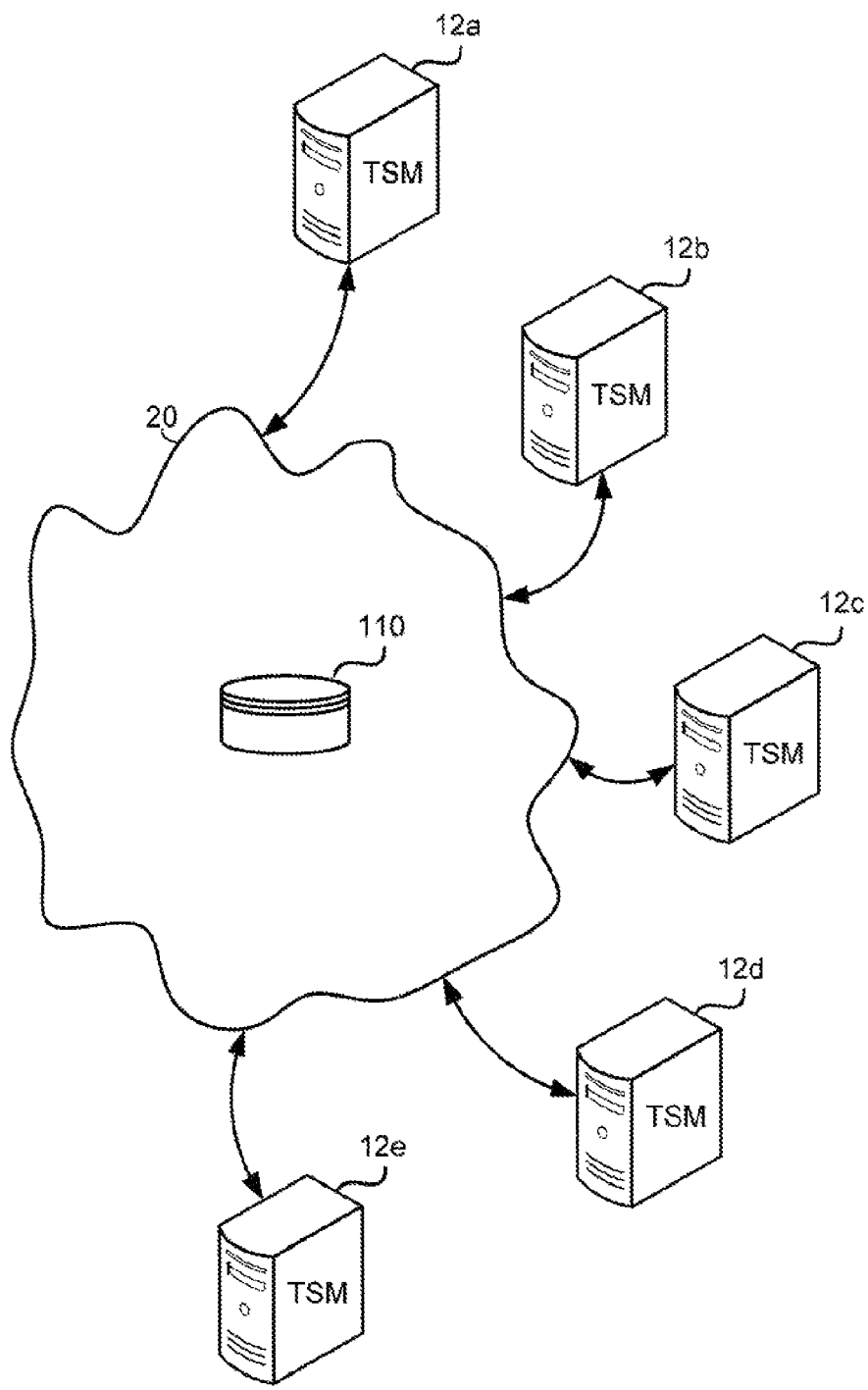
FIG. 4 is a component block diagram of a communication system suitable for use with another aspect.

In some aspects, a mobile device may not keep a record of the various TSM managing its security domains. In a key-based network, a mobile device may operate under the presumption that any properly encoded message is from the TSM. In such aspects, control over a security domain may be transferred by transferring the cryptographic key corresponding to that security domain. Accordingly, a central repository may store data mapping TSM providers to security domains. An overview of how such a directory may exist is shown in FIG. 4, which shows a diagram of a communication network in which a plurality of TSM servers 12a-12d have communication links to a central repository 110. The central repository 110 may be a database storage device coupled to a server providing connectivity and addressability via a secure network and/or the Internet. When a TSM provider provisions a new service on a mobile device, the TSM provider may create a directory listing uniquely identifying the security domain and mapping it to the TSM, and store this directory listing in the central repository 110 so that it may be accessed by any of the of TSM servers 12a-12d.

Figure 5:
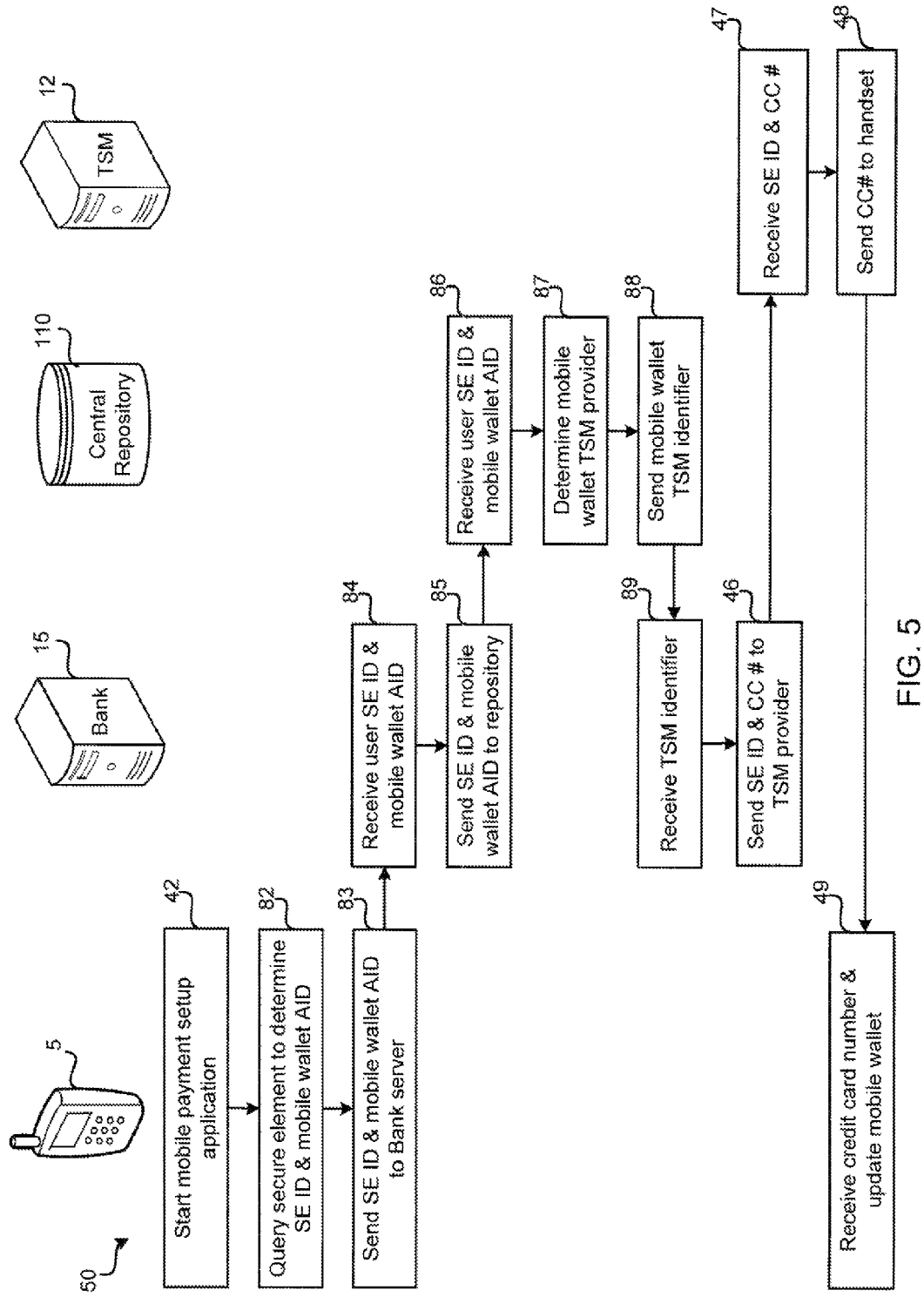
FIG. 5 is a process flow diagram of an aspect method for enabling secure service providers to discover the identity of a TSM server making use of a centralized directory of TSM accounts.

An overview of how a secure service provider may utilize a central repository of TSM providers is illustrated in FIG. 5, which shows a method 50 that may be implemented on computing devices. In method 50 at block 42, the mobile device 5 may start a mobile payment setup application. The setup application may query the secure element and discover the secure element identifier (i.e., the unique identifier of the secure element) and the application identifier ("AID") of the mobile wallet SSD at block 82. At block 83 the mobile device 5 may send a message with the secure element identifier and the mobile wallet AID to the bank server 15, and the message may be received by the bank server 15 at block 84. As previously discussed with reference to FIG. 2, messages communicating the various identifiers to the bank server 15 may be routed through an NFC terminal rather than a cellular network.

At block 85 the bank server 15 may send the secure element identifier and mobile wallet AID to the central repository 110, where it is received at block 86. At block 87 the central repository 110 may determine the TSM provider corresponding to the mobile wallet application on the mobile device 5 using the combination of secure element identifier, which is unique across all mobile devices, and the mobile wallet AID, which is unique for a given mobile device. At block 88 the central repository may send the TSM provider identity to the bank server 15, where it is received at block 89.

Based on the TSM provider identifier, at block 46 the bank server 15 may locate the TSM server 12 corresponding to the TSM provider and send a request to link the mobile device 5 to a credit card including the secure element identifier and the credit card number. In some aspects, the TSM provider identifier may be an IP address or domain name. In other aspects, the process of locating a TSM server based on a TSM server identifier may involve a broadcast message sent over one or more private networks of TSM servers. At block 47 the TSM server 12 may receive the request from the bank server 15. At block 48 the TSM server 12 may transmit a message for the mobile device 5 instructing it to update the mobile wallet with the specific credit card information. The message may be received by the mobile device 5 and the mobile wallet may be updated at block 49. In some aspects, the mobile wallet may verify the message by determining that it is properly encoded with a cryptographic key corresponding only to that particular mobile wallet SSD.

As previously discussed, the combination of a secure element identifier and security domain AID may serve as a unique identifier for any SSD across all mobile devices. A suitable data structure for mapping such a combination to a TSM provider is shown in FIG. 6, which shows a data table 111 that may be implemented in the central repository 110. The central repository 110 may store a data table 111 configured in the form of a plurality of data records (illustrated as rows) 113, 114, 115, and 116, with each data record comprising a plurality of data fields 91, 112, 93. For example, the data table 111 may contain a data field 91 for storing a security domain AID, a data field 112 for storing a secure element identifier, and a data field 93 for storing a TSM provider identifier.

Figure 7:
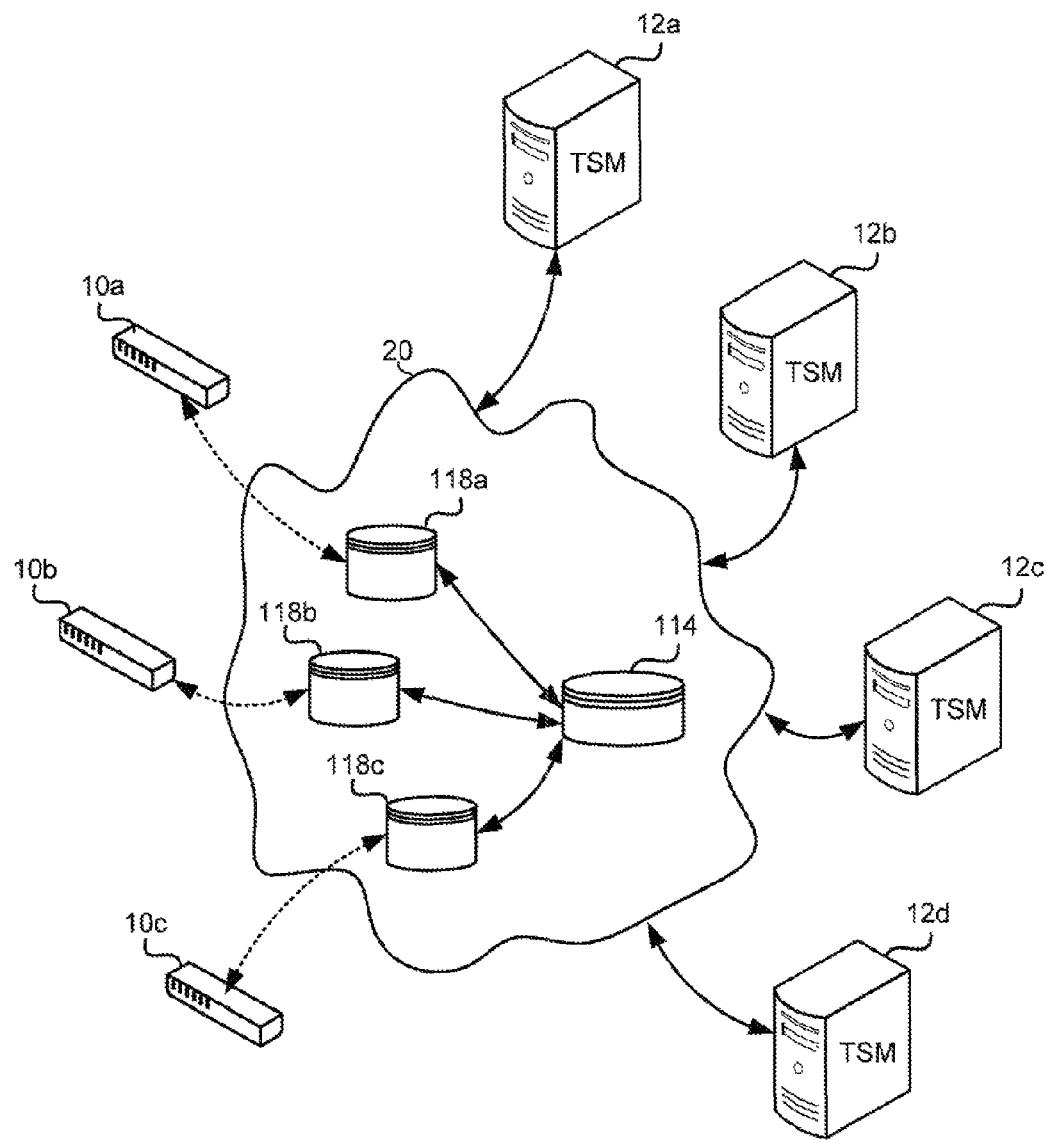
FIG. 7 is a component block diagram of a communication system suitable for use with another aspect.

In an alternative to a centralized repository 110, some aspects may utilize a distributed repository system. An overview of such an aspect is illustrated in FIG. 7, which shows a diagram of a communication network 20 including a distributed repository. A plurality of secondary repositories 118a-118c may be configured to store a mapping of TSM providers to security domains, while a primary repository 114 is configured to store a mapping of secure elements to the secondary repositories 118a-118c. Each of the primary and secondary repositories may include a server coupled In an aspect, the secondary repositories will correspond one-to-one with a cellular service provider, represented by mobile switching stations 10a-10c. In another aspect, the secondary repositories may correspond one-to-one with a primary TSM. When a new secure element is issued (e.g., when a phone is activated on a cellular network), the secure element may be assigned to a secondary repository and an entry in the primary repository 114 may be stored to map the secure element to a specific secondary repository 118a-118c. When a new service is provisioned on the secure element, the specific secondary repository 118a-118c may be updated to include a mapping of the new service to a TSM provider, represented by TSM servers 12a-12d.

Figure 8A:
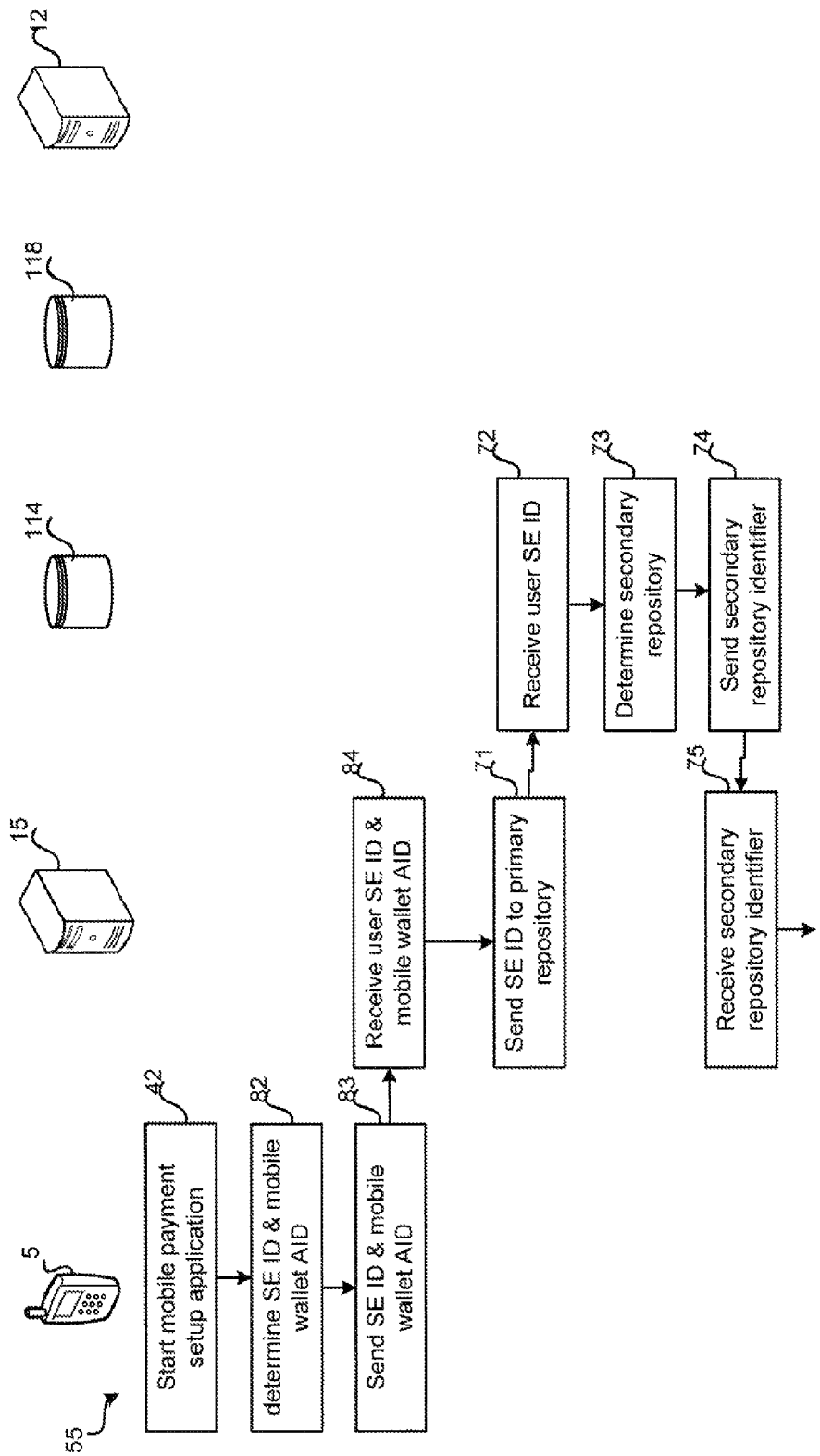
FIG. 8A which continues onto 8B is a process flow diagram of another aspect method for discovering the identity of a TSM server.

An overview of how a secure service provider may utilize a distributed repository of TSM providers is illustrated in FIG. 8, which shows a method 55 that may be implemented on computing devices. In method 55 at block 42 the mobile device 5 may start a mobile payment setup application. At block 82 the setup application may query the secure element and discover the secure element identifier (i.e., the unique identifier of the secure element) and the application identifier ("AID") of the mobile wallet SSD. At block 83 the mobile device 5 may send a message with the secure element identifier and the mobile wallet AID to the bank server 15, and the message may be received by the bank server 15 at block 84. As previously discussed with reference to FIG. 2, messages communicating the various identifiers with the bank server 15 may be routed through an NFC terminal rather than a cellular network.

At block 71 the bank server 15 may send the secure element identifier to a primary repository 114, where it is received at block 72. At block 73 the primary repository may determine which secondary repository tracks the TSM providers for the given secure element. At block 74 the identifier of the secondary repository is sent to the bank server 15, where it is received at block 75.

At block 85 the bank server 15 may locate the appropriate secondary repository 118 based on the identifier received at block 75 and send the secure element identifier and mobile wallet AID to that secondary repository 118, where it is received at block 86. At block 87 the secondary repository 118 may determine the TSM provider corresponding to the mobile wallet application on the mobile device 5 using the combination of secure element identifier, which is unique across all mobile devices, and the mobile wallet AID, which is unique for a given mobile device. At block 88 the central repository may send the TSM provider identity to the bank server 15, where it is received at block 89.

Based on the TSM provider identifier, at block 46 the bank server 15 may locate the TSM server 12 corresponding to the TSM provider and send a request to link the mobile device 5 to a credit card including the secure element identifier and the credit card number. In some aspects, the TSM provider identifier may be an IP address or domain name. In other aspects, the process of locating a TSM server based on a TSM server identifier may involve a broadcast message sent over one or more private networks of TSM servers. At block 47 the TSM server 12 may receive the request from the bank server 15. At block 48 the TSM server 12 may transmit a message for the mobile device 5 instructing it to update the mobile wallet with the specific credit card information. At block 49 the message may be received by the mobile device 5 and the mobile wallet may be updated. In some aspects, the mobile wallet may determine that the message is properly encoded with a cryptographic key corresponding only to that particular mobile wallet SSD.

The distributed repositories may utilize a series of data tables, such as those seen in FIGS. 9A and 9B, which shows data structures that may be implemented on a computing device. The primary repository 114 may store a data table 115 shown in FIG. 9A which may be composed of a plurality of data records (shown as rows) 121, 122, 123 and 124 each made up of at least two data fields 112, 116. The primary repository data table 114 may contain a data field 112 for storing a secure element identifier and a data field 116 for storing a secondary repository identifier. The various secondary repositories 118 may store a data table 119 shown in FIG. 9B which may be composed of a plurality of data records (shown as rows) 125, 126, 127, and 128 each made up of a plurality of data fields 99, 112, 93. The secondary repository data table 119 may contain a data field 91 for storing a security domain AID, a data field 112 for storing a secure element identifier, and a data field 93 for storing a TSM provider identifier.

Figure 10:
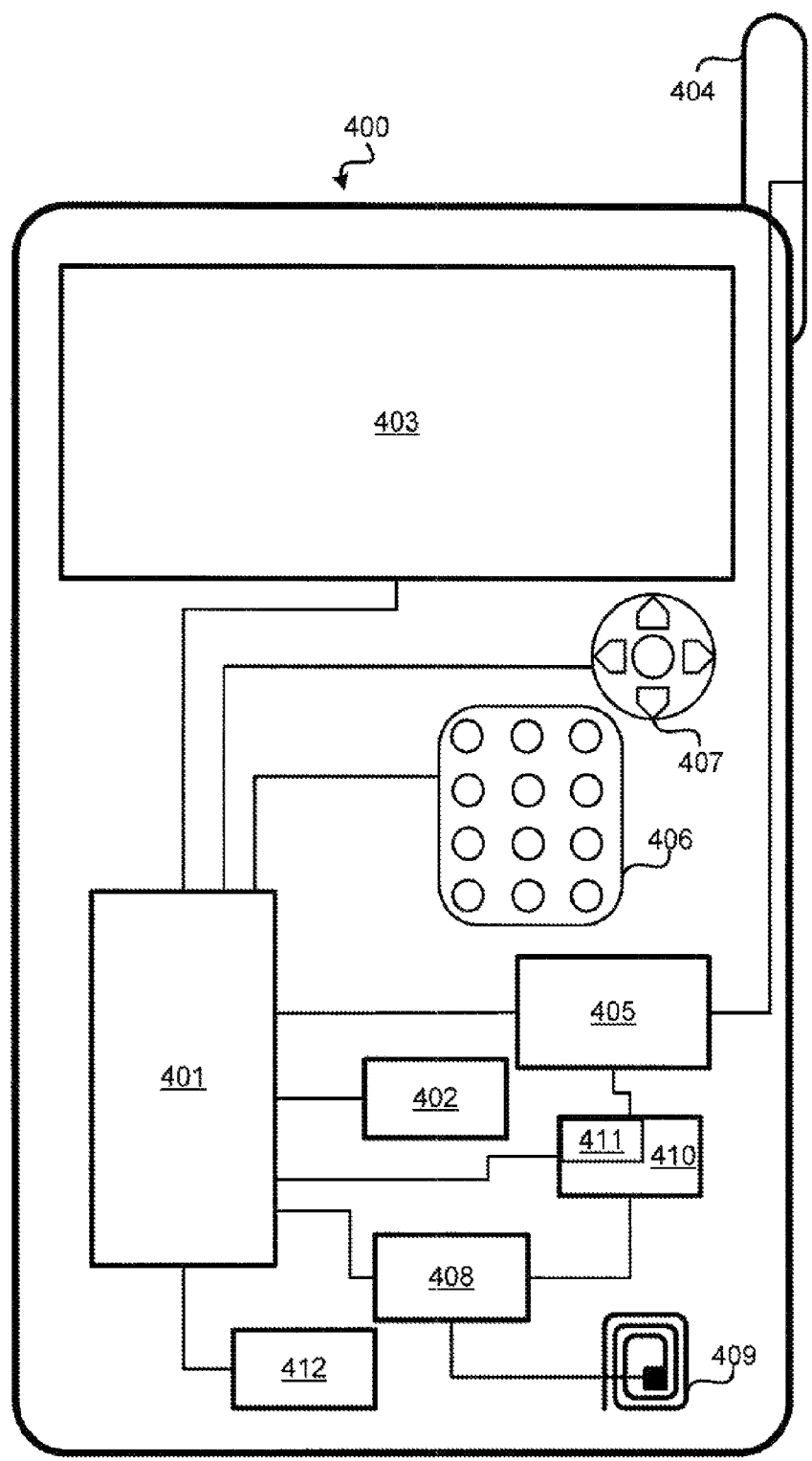
FIG. 10 is a component block diagram illustrating example components of a mobile device suitable for use in the various aspects.

Typical mobile devices suitable for use with the various aspects may have in common the components illustrated in FIG. 10. For example, a mobile device 400 may include a processor 401 coupled to internal memory 402, and a display 403. Mobile devices typically also include a key pad 406, a miniature keyboard, or a touch screen device, as well as menu selection buttons or rocker switches 407 for receiving user inputs.

Additionally, the mobile device 400 may have a long range antenna 404 for sending and receiving electromagnetic radiation that is connected to a wireless data link and/or cellular telephone transceiver 405 coupled to the processor 401. In some implementations, the cellular transceiver 405 and portions of the processor 401 and memory 402 used for cellular telephone communications are collectively referred to as the air interface since it provides a data interface via a wireless data link.

Additionally, the mobile device 400 may have a short range antenna 409 for sending and receiving short range RF signals that is connected to a wireless data link transceiver 408 coupled to the processor 401. For example, the wireless data link transceiver 408 may be a NFC transceiver, a Bluetooth® transceiver or a ZigBee® transceiver all of which are well known in the electronic communication arts.

The mobile device 400 may also include a secure element 410, which may be coupled to the processor 401. As described above, the secure element 410 may include a processor 411 that is configured with executable instructions to perform the functions of the secure element. The secure element 410 may also be coupled to the cellular transceiver 405 and be configured to send and receive cellular data messages without assistance or interference from the processor 401. The secure element 410 may further be coupled to the NFC transceiver 408 and be configured to send and receive NFC messages without assistance or interference from the processor 401.

The mobile device processor 401 and secure element processor 411 may be any programmable microprocessor, microcomputer or multiple processor chip or chips that can be configured by software instructions (applications) to perform a variety of functions, including the functions of the various aspects described herein. In some mobile devices, multiple processors 401 may be provided, such as one processor dedicated to wireless communication functions and one processor dedicated to running other applications. Typically, software applications may be stored in the internal memory 402 before they are accessed and loaded into the processor 401. In some mobile devices, the processor 401 may include internal memory sufficient to store the application software instructions. The internal memory of the processor may include a secure memory 412 which is not directly accessible by users or applications and that is capable of recording MDINs and SIM IDs as described in the various aspects. As part of the processor, such a secure memory 412 may not be replaced or accessed without damaging or replacing the processor. In some mobile devices, additional memory chips (e.g., a Secure Data (SD) card) may be plugged into the device 400 and coupled to the processor 401. In many mobile devices, the internal memory 402 may be a volatile or nonvolatile memory, such as flash memory, or a mixture of both. For the purposes of this description, a general reference to memory refers to all memory accessible by the processor 401, including internal memory 402, removable memory plugged into the mobile device, and memory within the processor 401 itself, the secure memory 412, and portions of the secure element 410 such as the memory storing the serial number (i.e., the secure element identifier).

Figure 11:
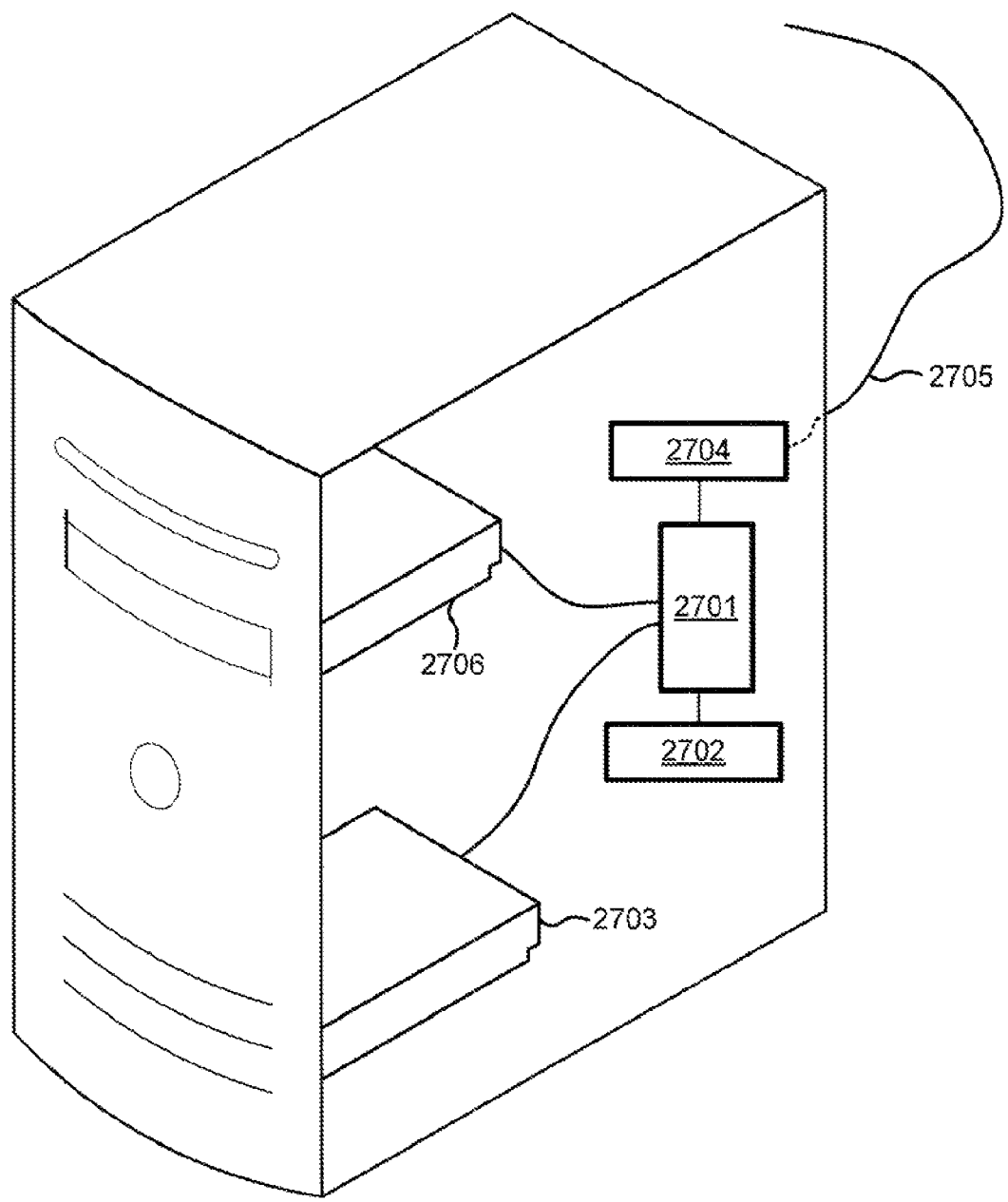
FIG. 11 is a component block diagram illustrating example components of a server suitable for use in the various aspects.

A number of the aspects described above may also be implemented with any of a variety of remote server devices, such as the server 2700 illustrated in FIG. 11. Such a server 2700 typically includes a processor 2701 coupled to volatile memory 2702 and a large capacity nonvolatile memory, such as a disk drive 2703. The server 210 may also include a floppy disc drive and/or a compact disc (CD) drive 2706 coupled to the processor 2701. The server 210 may also include a number of network ports 2704 coupled to the processor 2701 for establishing data connections with network circuits 2705, such as the Internet or secure transaction networks.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for identifying a trusted service manager (TSM) provider, comprising:
    determining by a processor a secure element identifier corresponding to a secure element of a computing device;
    determining by the processor an application identifier corresponding to a security domain within the secure element;
    providing by a mobile computing device, the secure element identifier and the application identifier to a first repository of TSM providers; and
    receiving, by a server, from the first repository, an identifier of the TSM provider that corresponds to the security domain;
    identifying by the server, a TSM provider using the received identifier; and sending, by the server, a request for a credit card link to the identified TSM provider, the credit card link request including the secure element and a credit card number.

2. The method of claim 1, further comprising:
providing the secure element identifier to a second repository of TSM providers; and
receiving, from the second repository, an identifier of the first repository.

3. The method of claim 1, wherein determining a secure element identifier corresponding to a secure element comprises:
sending a query to the secure element via a system bus connecting a central processor of the computing device; and
receiving the identifier from the secure element via the system bus.

4. The method of claim 1, wherein determining a secure element identifier corresponding to a secure element comprises:
sending a query to the secure element via a near field communication (NFC) communication link; and
receiving the identifier from the secure element via the NFC communication link.

5. The method of claim 3, wherein determining an application identifier corresponding to a security domain within the secure element comprises:
sending a query to the secure element via the system bus; and
receiving the identifier from the secure element via the system bus.

6. The method of claim 4, wherein determining an application identifier corresponding to a security domain within the secure element comprises:
sending a query to the secure element via the NFC communication link; and
receiving the identifier from the secure element via the NFC communication link.

7. The method of claim 1, wherein providing the secure element identifier and the application identifier to a first repository of TSM providers comprises:
sending, from the mobile device, a query to the first repository of TSM providers;
wherein the query includes the secure element identifier and the application identifier.

8. The method of claim 7, further comprising:
sending, from the mobile device to a server corresponding to a secure service provider, the identifier of the TSM provider that corresponds to the security domain.

9. The method of claim 1, wherein providing the secure element identifier and the application identifier to a first repository of TSM providers comprises:
sending, from a server corresponding to a secure service provider, a query to the first repository of TSM providers;
wherein the query includes the secure element identifier and the application identifier.

10. A computing device, comprising:
means for determining a secure element identifier corresponding to a secure element of a computing device;
means for determining an application identifier corresponding to a security domain within the secure element;
means for providing the secure element identifier and the application identifier to a first repository of TSM providers;

means for receiving, from the first repository, an identifier of the TSM provider that corresponds to the security domain;
means for identifying a TSM provider using the received identifier; and
means for sending a request for a credit card link to the identified TSM provider, the credit card link request including the secure element and a credit card number.

11. The computing device of claim 10, further comprising:
means for providing the secure element identifier to a second repository of TSM providers; and
means for receiving, from the second repository, an identifier of the first repository.

12. The computing device of claim 10, wherein means for determining a secure element identifier corresponding to a secure element comprises:
means for sending a query to the secure element via a system bus connecting a central processor of the computing device; and
means for receiving the identifier from the secure element via the system bus.

13. The computing device of claim 10, wherein means for determining a secure element identifier corresponding to a secure element comprises:
means for sending a query to the secure element via a near field communication (NFC) communication link; and
means for receiving the identifier from the secure element via the NFC communication link.

14. The computing device of claim 12, wherein means for determining an application identifier corresponding to a security domain within the secure element comprises:
means for sending a query to the secure element via the system bus; and
means for receiving the identifier from the secure element via the system bus.

15. The computing device of claim 13, wherein means for determining an application identifier corresponding to a security domain within the secure element comprises:
means for sending a query to the secure element via the NFC communication link; and
means for receiving the identifier from the secure element via the NFC communication link.

16. The computing device of claim 10, wherein means for providing the secure element identifier and the application identifier to a first repository of TSM providers comprises:
means for sending, from the computing device, a query to the first repository of TSM providers;
wherein the query includes the secure element identifier and the application identifier.

17. The computing device of claim 16, further comprising:
means for sending, from the computing device to a server corresponding to a secure service provider, the identifier of the TSM provider that corresponds to the security domain.

18. A financial transaction system, comprising:
a computing device;
means for determining a secure element identifier corresponding to a secure element of the computing device;
means for determining an application identifier corresponding to a security domain within the secure element;
means for providing the secure element identifier and the application identifier to a first repository of TSM providers;
means for receiving, from the first repository, an identifier of the TSM provider that corresponds to the security domain;

means for identifying a TSM provider using the received identifier; and means for sending a request for a credit card link to the identified TSM provider, the credit card link request including the secure element and a credit card number.

19. The financial transaction system of claim 18, further comprising:
   means for providing the secure element identifier to a second repository of TSM providers; and
   means for receiving, from the second repository, an identifier of the first repository.

20. The financial transaction system of claim 18, wherein means for determining a secure element identifier corresponding to a secure element comprises:
   means for sending a query to the secure element via a system bus connecting a central processor of the computing device; and
   means for receiving the identifier from the secure element via the system bus.

21. The financial transaction system of claim 18, wherein means for determining a secure element identifier corresponding to a secure element comprises:
   means for sending a query to the secure element via a near field communication (NFC) communication link; and
   means for receiving the identifier from the secure element via the NFC communication link.

22. The financial transaction system of claim 20, wherein means for determining an application identifier corresponding to a security domain within the secure element comprises:
   means for sending a query to the secure element via the system bus; and
   means for receiving the identifier from the secure element via the system bus.

23. The financial transaction system of claim 21, wherein means for determining an application identifier corresponding to a security domain within the secure element comprises:
   means for sending a query to the secure element via the NFC communication link; and
   means for receiving the identifier from the secure element via the NFC communication link.

24. The financial transaction system of claim 18, wherein means for providing the secure element identifier and the application identifier to a first repository of TSM providers comprises:
   means for sending, from the computing device, a query to the first repository of TSM providers;
   wherein the query includes the secure element identifier and the application identifier.

25. The financial transaction system of claim 24, further comprising:
   means for sending, from the computing device to a server corresponding to a secure service provider, the identifier of the TSM provider that corresponds to the security domain.

26. The financial transaction system of claim 18, wherein means for providing the secure element identifier and the application identifier to a first repository of TSM providers comprises:
   means for sending, from a server corresponding to a secure service provider, a query to the first repository of TSM providers;
   means for wherein the query includes the secure element identifier and the application identifier.

27. A tangible non-transitory processor-readable storage medium having stored thereon processor-executable instructions which when executed by a processor of a computing device cause the processor of a computing device to perform operations, comprising:
   determining a secure element identifier corresponding to a secure element of the computing device;
   determining an application identifier corresponding to a security domain within the secure element;
   providing the secure element identifier and the application identifier to a first repository of TSM providers;
   receiving, from the first repository, an identifier of the TSM provider that corresponds to the security domain;
   identifying a TSM provider using the received identifier; and
   sending the request for a credit card link to the identified TSM provider, the credit card link request including the secure element and a credit card number.

28. The tangible non-transitory processor-readable storage medium of claim 27, further comprising:
   providing the secure element identifier to a second repository of TSM providers; and
   receiving, from the second repository, an identifier of the first repository.

29. The tangible non-transitory processor-readable storage medium of claim 27, wherein determining a secure element identifier corresponding to a secure element comprises:
   sending a query to the secure element via a system bus connecting to the processor; and
   receiving the identifier from the secure element via the system bus.

30. The tangible non-transitory processor-readable storage medium of claim 27, wherein determining a secure element identifier corresponding to a secure element comprises:
   sending a query to the secure element via a near field communication (NFC) communication link; and
   receiving the identifier from the secure element via the NFC communication link.

31. The tangible non-transitory processor-readable storage medium of claim 29, wherein determining an application identifier corresponding to a security domain within the secure element comprises:
   sending a query to the secure element via the system bus; and
   receiving the identifier from the secure element via the system bus.

32. The tangible non-transitory processor-readable storage medium of claim 30, wherein determining an application identifier corresponding to a security domain within the secure element comprises:
   sending a query to the secure element via the NFC communication link; and receiving the identifier from the secure element via the NFC communication link.

33. The tangible non-transitory processor-readable storage medium of claim 27, wherein providing the secure element identifier and the application identifier to a first repository of TSM providers comprises:
   sending, from the processor, a query to the first repository of TSM providers;
   wherein the query includes the secure element identifier and the application identifier.

34. The tangible non-transitory processor-readable storage medium of claim 33, further comprising:
   sending, from the processor to a server corresponding to a secure service provider, the identifier of the TSM provider that corresponds to the security domain.

* * * * *